United States Patent [19]

Gilbreth

[11] Patent Number: 4,619,549

[45] Date of Patent: Oct. 28, 1986

[54] SCAFFOLDING CONNECTION APPARATUS AND METHOD

[75] Inventor: William E. Gilbreth, Huffman, Tex.

[73] Assignee: Builders Equipment and Tool Manufacturing Company, Houston, Tex.

[21] Appl. No.: 670,042

[22] Filed: Nov. 13, 1984

[51] Int. Cl.⁴ ............................ B25G 3/16; F16B 7/20
[52] U.S. Cl. .................................... 403/349; 403/271; 182/178; 29/463
[58] Field of Search ....................... 403/348, 349, 271; 182/178; 29/DIG. 18, 463

[56] References Cited

U.S. PATENT DOCUMENTS

| 2,719,061 | 9/1955 | Beatty | 403/349 X |
| 2,761,189 | 9/1956 | Robbins | 29/463 X |
| 4,432,662 | 2/1984 | Ronnkvist | 403/271 |

FOREIGN PATENT DOCUMENTS 948 of 1890 United Kingdom ................ 403/349
359371 10/1931 United Kingdom .

OTHER PUBLICATIONS

Safway "Tube & Clamp Scaffolding" Catalog S-30.

Primary Examiner—Andrew V. Kundrat
Attorney, Agent, or Firm—Norvell & Associates

[57] ABSTRACT

A male/female connection of the twistlock type is provided for coupling vertical scaffolding members. Both the male and female components are forged, and the connection components may be reliably welded to respective tubular scaffolding members or standards. The safety of the scaffolding is improved compared to mechanically crimped connections, and the cost of scaffolding field repair and maintenance is substantially reduced.

16 Claims, 5 Drawing Figures

SCAFFOLDING CONNECTION APPARATUS AND METHOD

FIELD OF THE INVENTION

The present invention relates to scaffolding connection devices and, more particularly, relates to a twist-lock-type coupling for interconnecting vertical standards for scaffolding. Methods are disclosed for forming a female connection component according to the teachings of the present invention.

BACKGROUND OF THE INVENTION

Scaffolding generally comprises a plurality of vertical support members or "standards", a plurality of horizontal bracing members, and a plurality of diagonally positioned cross members. Each of these members is generally formed from an elongate tubular section of pipe typically adapted at each end for interconnecting the ends to other scaffolding members. Elongate scaffolding members can thus be easily stored and transported to the desired construction site, where assembly is performed. After use, such scaffolding may be easily disassembled for storage or transportation to another site.

Many types of devices exist for interconnecting horizontal bracing members and diagonal cross members to support members, such as the devices disclosed in U.S. Pat. Nos. 4,044,523; 4,140,414; and 4,331,218. Although safety is paramount in the design of scaffolding, connection devices which have achieved widespread acceptance in the industry have appropriately balanced safety with ease of assembly and disassembly, manufacturing costs, and repair costs.

Interconnection of one vertical standard to another in order to achieve the desired platform height for the scaffolding is, in many respects, functionally dissimilar to other scaffolding interconnections. Scaffolding standards are the support members, and therefore must uphold the weight of the personnel and equipment on the scaffolding platform. When assembled, this interconnection is designed to functionally achieve a vertical unitary elongate support member, and reliability with respect to proper axial alignment of two assembled vertical standards is critical.

One commonly used technique for interconnecting vertical scaffolding support members involves the use of a male component having a pair of dogs connected to the end of one standard and a female component secured to an end of another standard and adapted to receive the male component. The male component is inserted in the female component and twisted together (generally requiring ¼ turn or less) to become locked. This twistlock interconnection has advantages of easy assembly and disassembly. Also, the interconnction is made without portions protruding from the diameter of the standard, thus minimizing damage and corrosion to the interconnection components. Such a twistlock interconnection for vertical standards is shown in a brochure entitled "Safway Tube and Clamp Scaffolding, Catalog S-30, 1979", hereby incorporated by reference.

The above described twistlock connection for scaffolding has, however, several significant disadvantages. First, the interconnection components are typically of cast-metal construction, and the components are generally inserted in the ends of a tubular member and the tubular member crimped to retain the connection components. This crimping operation, although relatively inexpensive when performed at the scaffolding manufacturing plant, cannot be reliably performed in the field without an expensive press. Accordingly, field repair of such scaffolding standards is either very expensive or impossible. As a practical matter, repair of such scaffolding standards in the field is rare, with the result being the frequent usage of defective scaffolding standards.

Secondly, the crimping operation described above cannot be reliably controlled with respect to structural integrity. In other words, the cold metal deformation required according to this crimping operation does not provide repeatable and calculatable maximum axial and radial load exposure values between the tubular member and the respective interconnection component. Accordingly, a single connection component/tubular member connection may be vastly oversized from a structural integrity standpoint, but this oversizing or high safety factor is required to obtain reasonable reliability throughout a number of connections.

Perhaps the most serious drawback to the crimped connection of tubular members to such components, however, relates to safety. The tubular member is, of course, weakened by the crimping operation. This connection, although usually initially rigid, tends to become loose, so that the cast component may move slightly axially and radially with respect to the pipe. This loosening cannot, however, be easily tested or visually detected. Over a period of time and use, the cast component/tubular member connection may become so loose as to cause structural failure of the scaffolding. Moreover, when this connection becomes loose, assembled sections of pipe may not be axially aligned or plumb, thus substantially reducing the load bearing ability of the assembled scaffolding. Finally, this non-rigid connection may not uniformly distribute the axial load between the cast component and the end of the tubular member. Scaffolding tubular members are conventionally of the seam-welded type, and thus a concentrated load may be applied to the end of the pipe at the point of the weld, causing the tubular member to split. The frequency and severity of a total or partial scaffolding failure may, unfortunately, be appreciated from a brief review of related accident reports.

The disadvantages of the prior art are overcome by the present invention, and improved methods and apparatus is hereinafter described for forming a reliable twistlock interconnection for vertical scaffolding support members.

SUMMARY OF THE INVENTION

Improved scaffolding support members are herein disclosed comprising connection components of the twistlock type. Both the male and female connection components are fabricated according to forging techniques, and are preferably welded to their respective tubular members. The male connection component includes a plurality of dogs which engage respective receiving surfaces in the female connection component to lock two support members or standards in a unitary structure.

The female connection component is fabricated from two similar shaped halves which are welded together to form a unitary female receptacle. The female receptacle is thereafter welded to an end of pipe about the entire periphery of the receptacle.

The assembled structure of the present invention may be easily repaired in the field utilizing conventional welding equipment and procedures. Moreover, the structural integrity of the forged component/tubular member assembly is both calculable and reliable within reasonable limits. The safety of the twistlock coupling has been significantly improved over the prior art.

These and other features and advantages of the present invention will become apparent from the foregoing detailed description, wherein reference is made to the Figures in the accompanying drawings.

DETAILED DESCRIPTION OF THE PREFERRED EMBODIMENT

Figure 1:
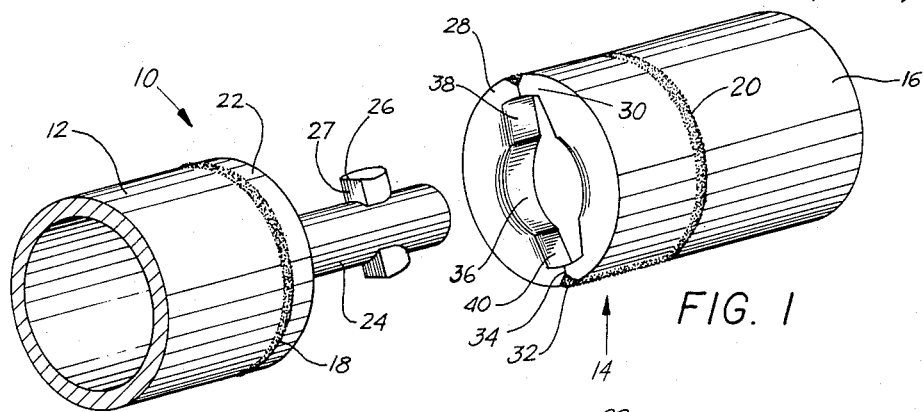
FIG. 1 is a pictorial view of male and female connection components welded to respective tubular members according to the present invention.

FIG. 1 depicts a suitable male and female connection components 10 and 14 according to the present invention which may be connected to respective tubular members 12 and 16 by annular welds 18 and 20. Male component 10 is fabricated from a forging operation to facilitate easy and reliable welding to the tubular member 12. Female component 14 is formed from a pair of forged half members 28 and 30, which are structurally welded at 32 along adjoining surfaces 34 as shown. When assembled, it should be understood that the two support members or standards shown in FIG. 1 are locked together in a vertical position to form a support member, such as upright member 2 shown in U.S. Pat. No. 4,044,523. Examples of support members according to the present invention are also shown in a brochure entitled "Betco Perfect System Modular Scaffolding", by Betco Scaffolds (1984) which is also hereby incorporated by reference.

Figure 2:
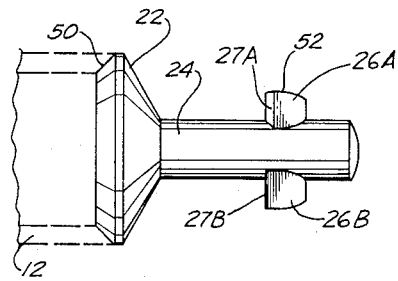
FIG. 2 is a side view of a suitable male connection component.

Male connection member 10 comprises a disk-shaped base portion 22 and a shaft portion 24 protruding from and axially aligned with portion 22. Affixed to the portion 24 are a pair of dog members 26A and 26B each having a respective locking surface 27A and 27B. FIG. 2 depicts a suitable male member which is not yet welded to a tubular member (shown in dashed lines). The two locking surfaces 27A, 27B of members 26 are preferably orientated at equal but oppositely inclined angles of approximately 7°. In FIG. 2, for example, the surfaces 27A and 27B are each inclined at angles of approximately 7° with respect to the plane perpendicular to the axis of portion 24, and aligned at an angle of approximately 14° with respect to each other. FIG. 2 also depicts tapered surface 50 for axially aligning the tubular member 12 with the axis of component 10. Once aligned, the male connection component 10 and the tubular member 12 may be joined by a suitable welding operation.

The female connection component 14 depicted in FIG. 1 comprises a pair of similar portions 28 and 30 which may be joined together by welding to form a unitary female member. The axes of the male and female components are aligned and the components twisted together to form a locked connection. Each portion 28 and 30 includes a semi-cylindrical outer body and a radially inwardly projecting portion terminating at a curvilinear shaft-receiving surface 36 and a pair of dog-receiving surfaces 38 and 40.

Figure 3:
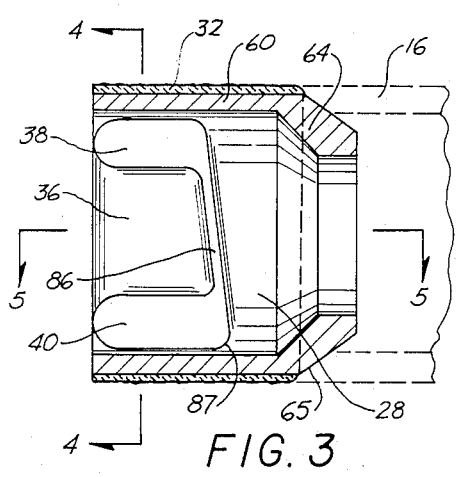
FIG. 3 is a cross-sectional view of a suitable female connection component.

FIG. 3 depicts a cross-sectional view of a suitable female component taken substantially through both welds 32. As shown in FIG. 3, the female component is aligned with but not welded to tubular member 16 (shown in dashed lines). Half portion 28 includes an interior portion defined by surfaces 36, 38 and 40, a semi-cylindrical outer portion 60, and a tapered end portion 64 for welding to a tubular member. The portion 64 is tapered as shown so that tubular members having slightly different outer diameters and/or wall thicknesses can be easily aligned with the female component for the welding operation. Thus, surface 65 protrudes radially inwardly for accommodating different types of pipes or tubular members, and the male component 10 may similarly be provided with such a tapered end portion.

Figure 4:
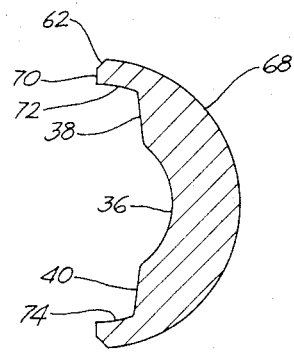
FIG. 4 is a cross-sectional view of the apparatus depicted in FIG. 3.

FIG. 4 depicts a cross-sectional view through the portion 28 shown in FIG. 3. The outer circularshaped surface 68 of portion 28 approximates the outer diameter of the tubular member 16. Chamfered surface 62 is provided so that the weld 32 does not extend substantially radially beyond the diameter of the surface 68, and more surface area is thereby provided for a suitable weld. The thinnest portion of the female member is shown in the vicinity of surface 62, and it should be understood that surfaces 70 are aligned for engagement prior to the welding operation. Moreover, the weld 32 substantially increases the strength in the vicinity of surface 70, so that there are no structurally weak sections in the assembled female component. The relationship between surfaces 36, 38, and 40 is shown in FIG. 4, and each of these surfaces has a rounded transition to adjoining surfaces, so that there are no sharp edges within the female component.

Figure 5:
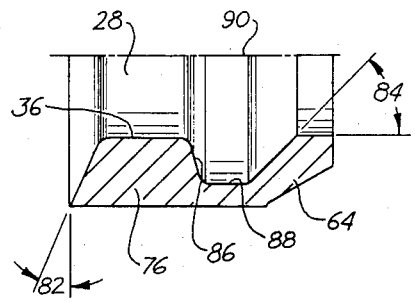
FIG. 5 is a cross-sectional view taken along the axis of the female connection component shown in FIG. 3.

FIG. 5 is a cross-sectional view of the female connection member, taken along the axis of the connection member as shown in FIG. 3, which is aligned with the axis of the pipe 16. The inner portion 76 is shown, including surface 36, and the rounded surfaces of the inner portion are also illustrated. As shown in FIG. 3, surface 86 is provided at an angle with respect to a plane perpendicular to the axis of the female component, and is adapted for engagement with surface 27 of the dog member upon relative rotation of the male and female components. Surface 86 is also angled as shown in FIG. 5 at approximately 7° for sliding engagement with surface 27. A similar dog receiving surface is, of course, provided in the other half portion 30. When in the assembled position, the dog member rotates in cavity 88. The interior angle of portion 64 is depicted at 84, and is approximately 45°.

Referring again to FIGS. 1 and 4, the female component 14 is formed by forging two half components 28 and 30 each having a substantially C-shaped crosssectional configuration. The end surfaces 70 are brought into abutting relationship, and the half components are welded together to form an assembled female component. Thereafter, the assembled component is aligned with a suitable tubular member (as shown in FIG. 3), and welded about its periphery to the tubular member 16.

During assembly of the support members, the male component 10 welded to a first tubular member 12 is inserted in a receptacle provided in the female component 14 welded to a second tubular member 16. Rotation of the male component relative to the female component can only occur in one direction, since in the opposite direction, the dogs 27 contact the corner 81 of the radially inward body (see FIG. 3). The support members are rotated (typically ¼ turn or less) as each dog moves up its respective surface 86. The end of the outer body 60 of the female component is aligned with and in sliding engagement with the male component, so that rotation of the male component relative to the female component stops and the interconnection is locked when the dogs 27 can no longer proceed up the surface 86. Because of the reduced angle of surface 86 (generally in the range of 6° to 8° as illustrated in FIG. 3), a camming-type action is established so that a relatively nominal torque between the two standards produces a substantial axially directed force holding the two components in a locked position.

A further problem with the prior art standards utilizing a tubular member which is crimped to a cast component is that close tolerances were not maintained between the end of the pipe and the equivalent angled surface 86 of the female receptacle. If the depth of insertion of the cast female receptacle in the tubular member changed, this end-of-pipe to angled-surface dimension changed. Also, if over, a period of time the cast component moved axially with the tubular member, this dimension also changed. In the prior art, this dimensional problem occasionally resulted in a condition wherein the male and female cast components might not become in a locked position, because the dogs could move past the equivalent of the corner 87. According to the present invention, this problem is eliminated since the dimension between the surface 86 and the portion of the female component in engagement with the male component can be closely controlled through the unitary structure of the female component. Moreover, this allows one to utilize a lower cam angle for the surface 86, as less than 6°. Alternatively, one may utilize the same cam angle as that provided in the prior art, but repeatedly the same approximate rotational movement of the standards would be required in order to obtain a locked condition. An indication of an unusual problem (e.g., a particle of gravel lodged between the dog and the surface 86) would be noticed during assembly, since the normal degree of rotational movement to obtain the locked condition would not occur.

The present invention allows standards to be easily repaired in the field utilizing conventional cutting and welding equipment. Moreover, with a supply of male and female forged components and tubular members, standards can, if necessary, be fabricated in the field. The welding operation may be easily controlled to produce uniform structural integrity between the forged component and the tubular member. The safety of scaffolding standards is substantially increased over the prior art, since a rigid connection between the male and female components and their respective tubular members results in a plumb scaffolding assembly. Moreover, uniform load distribution is obtained about the perimeter of both the rigid forged component and the tubular member, because of the welded connection of these items. The likelihood of splitting of the seam-welded tubular members is therefore substantially reduced.

It is within the concept of the present invention to utilize one or more dogs for the male component, although two dogs are preferable. Also, the formation of the female component from a pair of half components each having a substantially a C-shaped cross-sectional configuration is preferred, although assembly of a forged female component from differently shaped subcomponents is possible.

It is readily apparent from the foregoing description of the methods and apparatus disclosed herein that modifications and substitutions of components may be made without departing from the concept of the present invention. Accordingly, it should be understood that the apparatus and techniques herein depicted and described are intended as examples only and not as limitations on the scope of the invention.

What is claimed is:

1. A scaffolding support including first and second tubular members adapted for axial alignment to form an elongate tubular support member, the improvement comprising:
    a forged-construction male interconnection component having at least one outwardly projecting dog member;
    a forged-construction female interconnection component having a male-receiving receptacle and a substantially circular front end surface adapted for sliding engagement along a periphery of said male component;
    said female interconnection including first and second portions joined together by a welding, each portion having a substantially C-shaped cross-sectional configuration and a tapered dog engaging surface selectively positioned on said portion for engaging said at least one dog member;
    said male component being weldedly affixed about its periphery to said first tubular member; and
    said female component being weldedly affixed about its periphery to said second tubular member.

2. A scaffolding support as defined in claim 1, wherein a diameter of an outermost portion of said female component substantially conforms to an outer diameter of said second tubular member, and said outermost portion of said female component is positioned in abutting engagement with said second tubular member for welded engagement of said female component to said second tubular member.

3. A scaffolding support as defined in claim 1, wherein said female component includes a rear tapered end portion having a circular cross-sectional configuration for axially aligning said female component with said second tubular member.

4. A scaffolding support as defined in claim 2, wherein the diameter of an outermost portion of said male component substantially conforms to an outer diameter of said first tubular member, and said outermost portion of said male component is positioned in abutting engagement with said first tubular member for welded engagement of said male component to said first tubular member.

5. A scaffolding support as defined in claim 4, wherein said male component includes a rear tapered end portion having a circular cross-sectional configuration for axially aligning said male portion with said first tubular member.

6. A scaffolding support as defined in claim 1, wherein said male component includes a pair of dog members, said female component includes a corresponding pair of dog engaging surfaces, and each of said dog engaging surfaces is selectively positioned on said female component with respect to said front end surface.

7. A scaffolding interconnection component, comprising:
  a first forged-construction half portion having a substantially C-shaped cross-sectional configuration;
  a second forged-construction half portion having a substantially C-shaped cross-sectional configuration;
  said first half portion and said second half portion being joined together by a welding to form a forged-construction female scaffolding support component having an opening for receiving a male scaffolding component; and
  said forged-construction female scaffolding component includes a rear tapered end surface having a circular cross-sectional surface for axially aligning said female component with a tubular member.

8. A scaffolding support as defined in claim 7, wherein:
  said female component includes a substantially front end surface adapted for sliding engagement along a periphery of said male component; and
  said female component includes a tapered dog engaging surface selectively positioned on said female component with respect to said front end surface.

9. A method of forming a female scaffolding component having a male-receiving aperture including one or more dog-receiving portions for enabling locking engagement of a male component with said female component, comprising:
  forging a first half portion having a substantially C-shaped cross-sectional configuration and a first tapered dog engaging surface for engaging said male component;
  forging a second half portion having a substantially C-shaped cross-sectional configuration and a second tapered dog engaging surface for engaging said male component; and
  welding said first half portion to said second half portion at locations radially aligned with said one or more dog-receiving portions to form a forged-construction female interconnection component.

10. The method as defined in claim 9, further comprising:
  forming a rear tapered end surface on said forged-construction female component having a circular cross-section for axially aligning said female component with a tubular member.

11. A scaffolding component as defined in claim 6, wherein each of said pair of dog engaging surfaces is tapered at an angle of less than approximately 6° with respect to a plane perpendicular to an axis of said second tubular member.

12. A scaffolding interconnection component as defined in claim 7, wherein the diameter of an outermost portion of said female scaffolding support component substantially conforms to an outer diameter of said tubular member for welded engagement of said female component to said tubular member.

13. A scaffolding support as defined in claim 8, wherein said dog engaging surface is tapered at an angle of less than approximately 6° with respect to a plane perpendicular to the central axis of said scaffolding support.

14. A method as defined in claim 9, further comprising:
  forming said female scaffolding components with a substantially circular front end surface adapted for sliding engagement along a periphery of said male component.

15. A method as defined in claim 14, further comprising:
  forming a tapered dog engaging surface selectively positioned within said female component with respect to said front end surface.

16. A method as defined in claim 15, wherein said dog engaging surface is selectively tapered at an angle of less than approximately 6° with respect to a plane perpendicular to a central axis of said female component.

* * * * *